United States Patent
Wochaski

(12) 
(10) Patent No.: US 6,254,161 B1
(45) Date of Patent: Jul. 3, 2001

(54) REINFORCEMENT SYSTEM FOR AN AUTOMOTIVE VEHICLE FENDER AND BRACKET THEREFOR

(75) Inventor: Edward J. Wochaski, Livonia, MI (US)

(73) Assignee: Illinois Tool Works Inc, Glenveiw, IL (US)

( * ) Notice: Subject to any disclaimer, the term of this patent is extended or adjusted under 35 U.S.C. 154(b) by 0 days.

(21) Appl. No.: 09/426,012

(22) Filed: Oct. 25, 1999

(51) Int. Cl.[7] ................................................... B62D 27/00
(52) U.S. Cl. ........................... 296/29; 296/191; 293/155; 248/229.16; 248/225.11
(58) Field of Search .......................... 296/198, 27, 191; 273/1, 154, 155; 248/229.16, 225.11, 231.81, 227.3; 280/154

(56) References Cited

U.S. PATENT DOCUMENTS 4,973,102 * 11/1990 Bien ........................................ 296/187
5,957,512 * 9/1999 Inada et al. ............................. 293/102

* cited by examiner

Primary Examiner—D. Glenn Dayoan
Assistant Examiner—Jason Morrow
(74) Attorney, Agent, or Firm—Lisa M. Soltis; Mark W. Croll; John P. O'Brien

(57) ABSTRACT

A bracket (10) constructed from a single metal blank (20) is generally L-shaped and includes a first arm (16) for attachment to a member (12) requiring reinforcement and a second arm (18) for snap-on affixation to a pillar (14). The arms interconnect via a connecting portion (40). A pair of tabs (36,38) on the second arm (18) each include a cantiliver spring (50) which locks to the pillar (14) when the tabs are received within the pillar slots (64, 66, 70, 72). Typically, two brackets (10) are used to secure a fender (12) to a pillar.

11 Claims, 2 Drawing Sheets

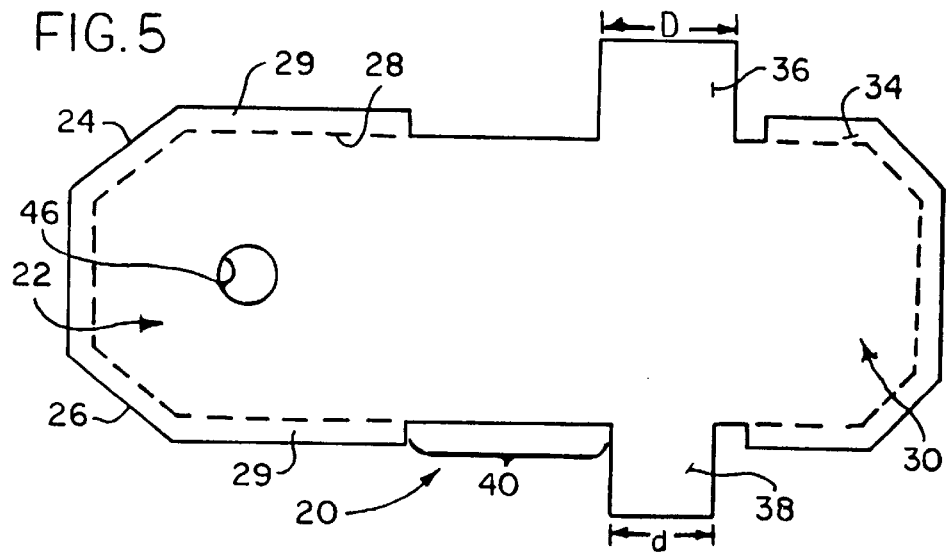
FIG. 5
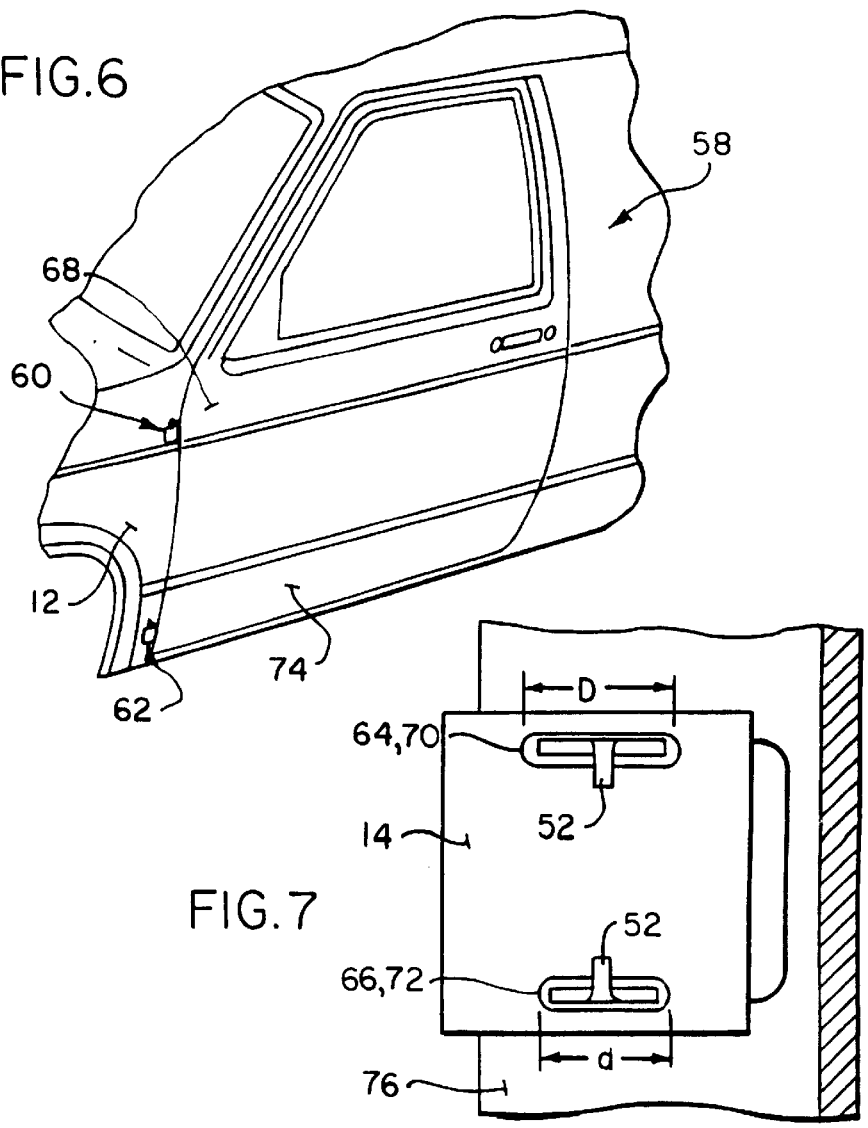
FIG. 6
FIG. 7

REINFORCEMENT SYSTEM FOR AN AUTOMOTIVE VEHICLE FENDER AND BRACKET THEREFOR

BACKGROUND

1. Background of the Invention

The present invention relates generally to a bracket, and, more particularly, to a bracket especially advantageous for reinforcing the mounting of a sheetlike metal member to a supporting element such as an automotive vehicle fender to the vehicle body, for example.

2. Description of Related Art

A fender for an automotive vehicle serves two main purposes, namely, to reduce damage from stones, mud and water thrown by the wheels during use, and also for overall appearance aesthetics. Since fenders are not primary supporting structures, the tendency has been to make them of relatively thin metal stock which is subject to being easily bent from predetermined manufactured design configuration. Such unsightly bending can result from forceful pushing, leaning or shoving against the fender, for example.

It is, therefore, desirable to provide means for reinforcing a fender tending to resist deformation while enabling the fender to be otherwise constructed in a lightweight and relatively inexpensive manner from thin metal stock.

SUMMARY OF THE INVENTION

It is a primary aim and object of the present invention to provide a reinforcing system for application to a sheetlike metal member that is mounted to a rigid member.

A further object is the provision of a reinforcing system as in the previous object especially advantageous for application to reinforcing the mounting of an automotive vehicle fender to the body frame.

The bracket of this invention is formed from a single metal blank into a general L-shape, one arm being secured to the sheetlike metal by a bolt or screw, for example, and the other arm including first and second resilient spring elements for locking receipt in openings in a rigid member. A further resilient spring element located between the first and second spring elements provides force in such direction as to reinforce the resilient locking action of the spring elements.

DESCRIPTION OF THE DRAWINGS

These and other objects and advantages of the present invention will become more readily apparent upon reading the following detailed description and upon reference to the attached drawings in which:

FIG. 5 is a plan view of a metal blank from which the described bracket is made;

FIG. 6 depicts in partially fragmentary view an automotive vehicle in which the system of the invention is advantageously utilized; and FIG. 7 shows in elevation the described bracket mounted to a pillar and fender tab in reinforcing relation.

DESCRIPTION OF A PREFERRED EMBODIMENT

Figure 1:
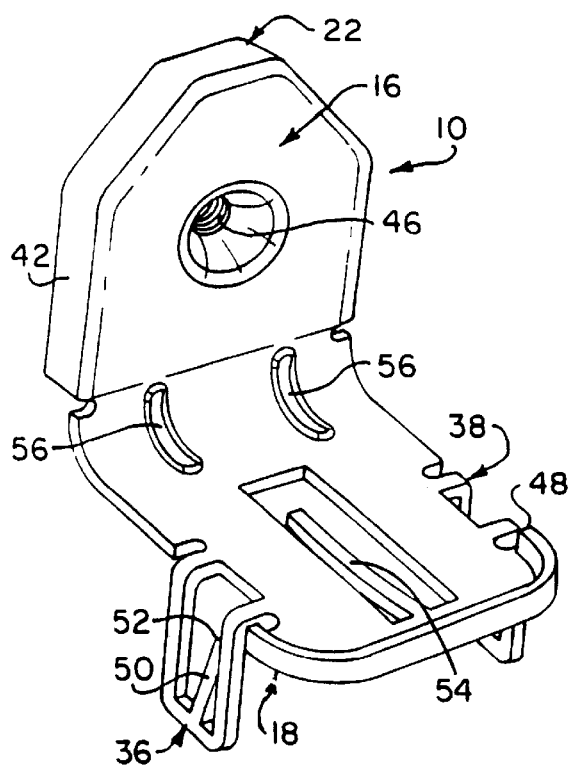
FIG. 1 is a perspective view of a bracket in accordance with the present invention.
Figure 4:
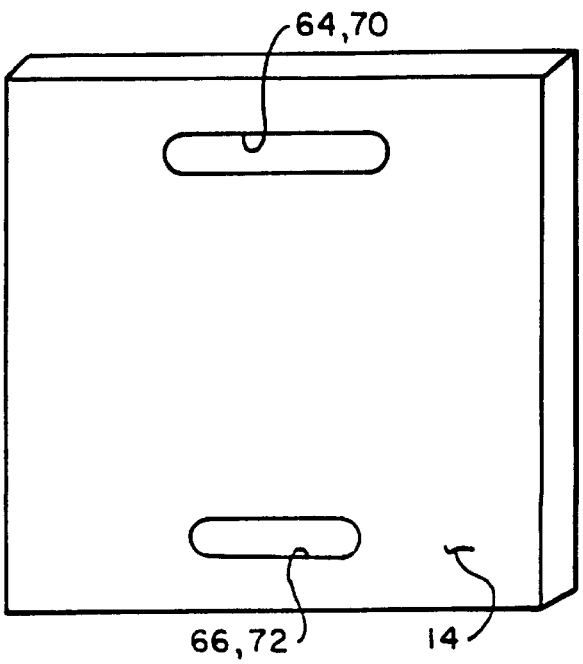
FIG. 4 is a perspective, partially fragmentary view of a pillar to which the described bracket is mounted.

Turning now to the drawings and particularly FIG. 1, there is shown a bracket 10 of the present invention which can be most advantageously employed in a system for reinforcing the mounting of a sheetlike member to a rigid support, such as an automotive vehicle fender 12 to a body frame pillar 14 of the vehicle (FIG. 4), for example.

The bracket 10 is generally L-shaped including a first arm 16 for securement to a member requiring reinforcement and a second arm 18 for snap-on affixation to an ultimate reinforcement member, such as a vehicle frame pillar 14, for example. Moreover, as will be described in detail, the bracket is constructed from a single metal blank 20 (FIG. 5) by appropriate bending and draw forming, followed by a heat treatment process to achieve the final desired hardness condition.

Turning now to FIG. 5, the blank 20 is seen to be elongated and generally rectangular, a first end portion 22 having outer end corners trimmed-off at 24 and 26 and a bend line 28 defining an outer edge border 29. A second opposite end portion 30 has truncated, rounded corners and a bend line 32 defining a generally uniformly wide edge border 34. First and second generally rectangular tabs 36 and 38 extend oppositely and laterally outwardly from the end portion 30. The width D of tab 36 is greater than the dimension d of tab 38, otherwise the two tabs are identical.

A generally rectangular connecting portion 40 integrally relates the end portions 22 and 30 and in the finished bracket forms the corner between the arms 16 and 18.

Figure 3:
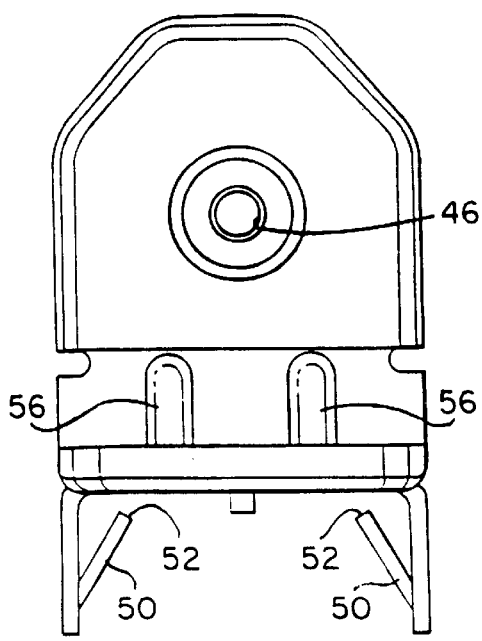
FIG. 3 is a front elevational view of the bracket of FIGS. 1 and 2.

By techniques well-known in the machine and tool industry, the first end portion 22 has the edge border 29 formed about the bend line 28 into a flange 42 (FIG. 3) extending normally to the remainder of the blank material of end portion 22. Also, a sleeve 44 is formed at a centrally located point 46 on the blank which extends in the same direction as the flange 42. The sleeve is preferably threaded by a tapping or roll-threading.

Similarly, the edge border 34 on the second end portion 30 is formed into a flange 48 about bend line 32. By a progressive forming operation, the tabs 36 and 38 are bent normally to the main body of the second arm portion 18 and oppositely directed from the flange 48. Moreover, material is removed from each tab to provide in each a single cantilever leaf spring 50, the two free ends 52 of which extend generally back toward the main body of the second arm portion and, as well, are bent toward each other somewhat.

Moreover, in the central part of the second end portion 30, generally midway between tabs 36 and 38, there is formed a further cantilever leaf spring 54, the free end of which extends toward the connecting portion 40. The spring 54 is formed into a convex curve which extends outwardly generally between the tabs 36 and 38.

Figure 2:
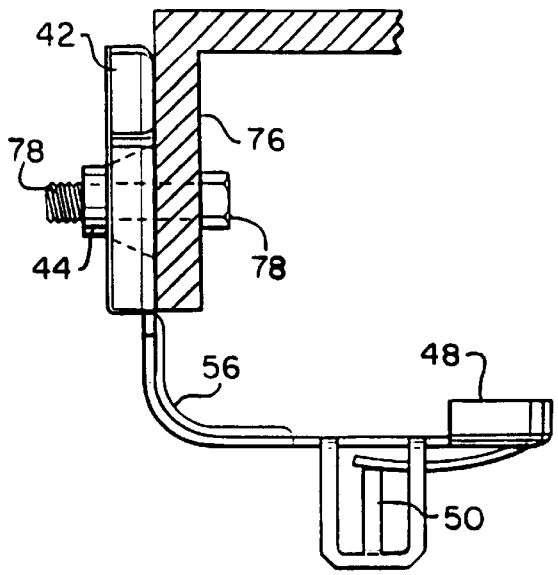
FIG. 2 is a side elevational view of the bracket of FIG. 1.

The end portions 22 and 30 are also formed in the connecting portion 40 so as to extend generally normally to one another creating the bracket overall L-shape referenced earlier. As shown in FIGS. 1 and 2, in addition to the connecting portion being formed into a curved corner to orient the end portions normally to one another, a pair of generally linear indentations 56 extend across the curved part to provide geometric stiffening reinforcement of the connecting portion 40.

Turning now to FIG. 6, there is shown a front half of an automotive vehicle 58 to which a fender 12 is shown in typical mounted relation. In accordance with the present invention, a pair of brackets 60 and 62, identically constructed to the bracket 10, affix the fender 12 to the adjacent frame pillar 14 to provide the reinforcement system of this invention. More particularly, the pillar includes a first pair of parallel spaced apart slots 64 and 66, slot 64 having a width sufficient to accommodate the wider tab 36 and slot 66 has a lesser width for receiving a narrower tab 38. The slots 64 and 66 are located opposite the top panel 68 of the car door. A second pair of spaced apart slots 70 and 72 are formed in the pillar (similar to the slots 64 and 66) opposite the door lowermost panel 74.

In assembly, the tabs of the two brackets 60 and 62 are lockingly fitted into the respective pairs of slots 64, 66 and 70, 72. Then, each bracket first arm 16 is secured to a fender tab 76 by a bolt 78 driven through the tab and into the threaded sleeve 44 (FIGS. 7 and 2). It is important to note that when the bracket tabs are fully positioned within the pillar openings that the spring ends 52 lock to the wall openings preventing withdrawal of the bracket tabs from the pillar openings. The further spring 54 coacts with springs 50 to fully and resiliently lock the bracket to the pillar and thus the fender to the pillar.

Although the present invention is disclosed in connection with a preferred embodiment, it is to be understood that one skilled in the appertaining arts may make modifications coming within the spirit of the invention disclosure and the appended claims.

What is claimed is:

1. A bracket system, comprising:

a pillar having a pair of spaced apart slots;

an elongated metal plate formed into generally L-shaped first and second end portions including an integral connecting portion therebetween;

said first end portion including a threaded sleeve and an outer edge portion formed into a flange extending generally parallel to the sleeve axis;

said second end portion including an outer end margin formed into a flange, and first and second tabs extending laterally in opposite directions from said second portion, said tabs being respectively dimensioned for lockingly fitting into the respective pillar slots;

each tab including a cantilever leaf spring, the free ends of said cantilever leaf springs both facing toward the second end portion; and a further cantilever leaf spring formed in the second end portion intermediate the first and second tabs.

2. A bracket system as in claim 1, in which the pillar slots have different lengths and the tabs have corresponding different dimensions so as to enable only one fitting arrangement of said tabs within the pillar slots.

3. A bracket system as in claim 1, in which when the tabs are assembled within the pillar slots, the free ends of the cantilever springs of the first and second tabs obstructingly engage the pillar preventing withdrawal of the tabs from the respective slots, and the further cantilever spring resiliently engages the pillar to provide a snug immovable arrangement of bracket to pillar.

4. A bracket system as in claim 1, in which the plate first end portion is assembled to the sheetlike member with the flange edge contacting said sheetlike member, and a bolt member is received through the sleeve and an opening in said sheetlike member.

5. A bracket system as in claim 1, in which the connection portion includes first and second spaced apart indentations for reinforcement.

6. A bracket system as in claim 1, in which the further cantilever spring free end faces toward the connection portion.

7. A system for reinforcing an automotive vehicle fender, comprising in combination:

a vehicle frame pillar;

an L-shaped bracket having a first end portion with a threaded sleeve thereon;

a bolt received within the threaded sleeve;

a second end portion of the bracket having a pair of spaced apart tabs for receipt within the pillar slots; and locking means on the bracket tabs preventing withdrawal of the said tabs from the pillar slots.

8. A system as in claim 7, in which there is further provided a second bracket similar to said first bracket interconnecting a second pair of pillar slots with a further pair of spaced pair of bracket tabs as in the case of said first bracket.

9. A system as in claim 8, in which each pair of pillar slots includes one slot of a predetermined length and another slot of a different length, said bracket tabs being so dimensioned as to enable receipt within a given pair of slots in a single arrangement.

10. A system as in claim 8, in which the pillar is oriented generally vertically with the two brackets similarly vertically spaced from one another.

11. An elongated, generally rectangular, one-piece metal blank for being formed into a reinforcing bracket, comprising:

a first end portion having outer end corners trimmed-off and a bend line inwardly of the blank outer edge extending about the first end portion forming a flange;

a second opposite end portion with trimmed-off end corners and a bend line inwardly of the blank outer edge forming a further flange;

first and second rectangular tabs extending laterally outwardly from opposite blank side edges, said tabs having different dimensions as measured along a blank longitudinal axis; and a connecting portion integral with the first and second end portions.

* * * * *